Feb. 24, 1970　　　G. MAZZIER ET AL　　　3,496,627
METHOD OF FORMING BALL TIPS FOR BALL POINT PENS
AND BALL TIPS FORMED THEREBY
Filed May 17, 1967　　　　　　　　　　7 Sheets-Sheet 1

INVENTORS
GIUSEPPE MAZZIER
FRANCESCO MAZZIER
BY Fulwider, Patton, Rieber,
Lee, and Utecht
ATTORNEYS

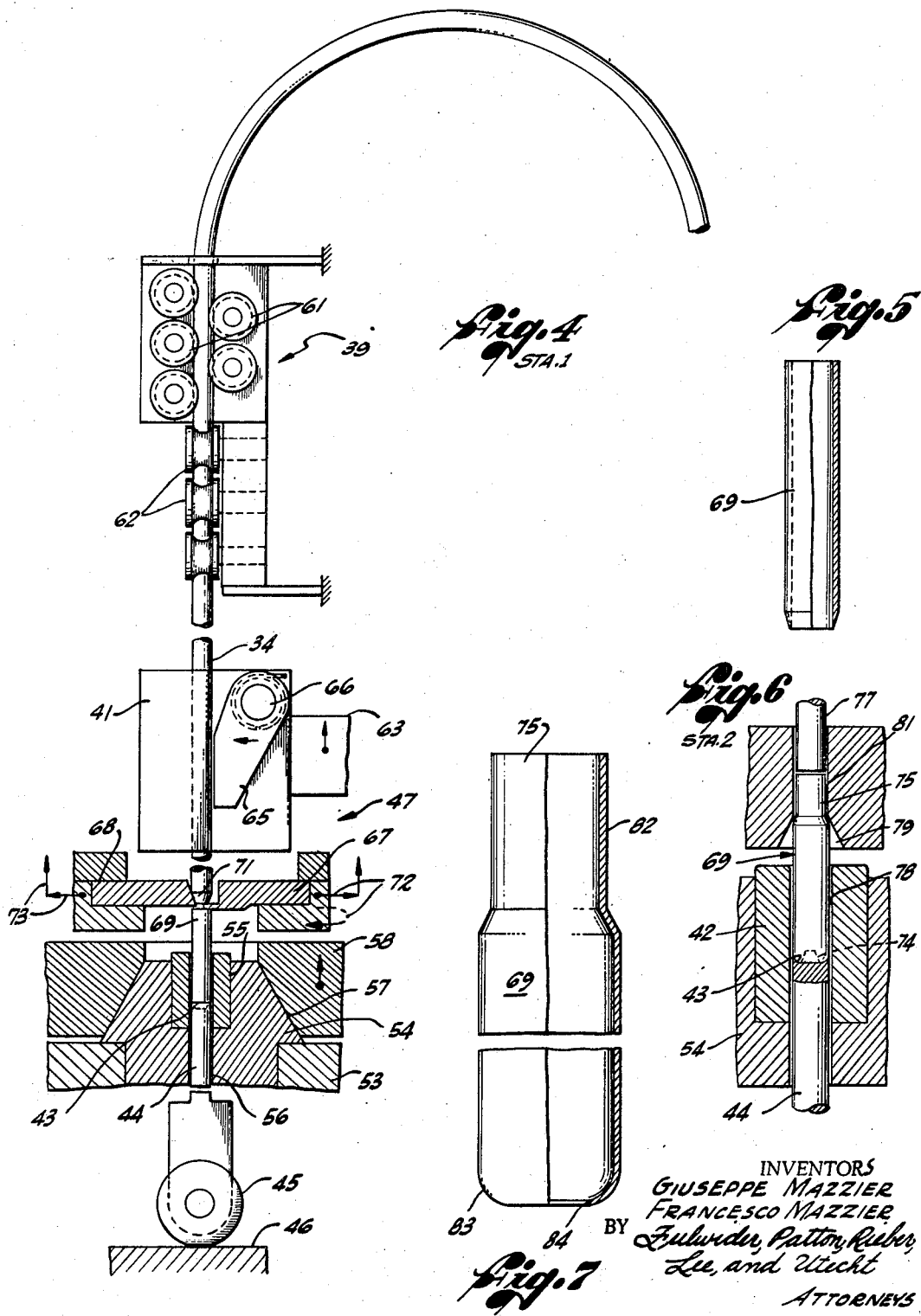

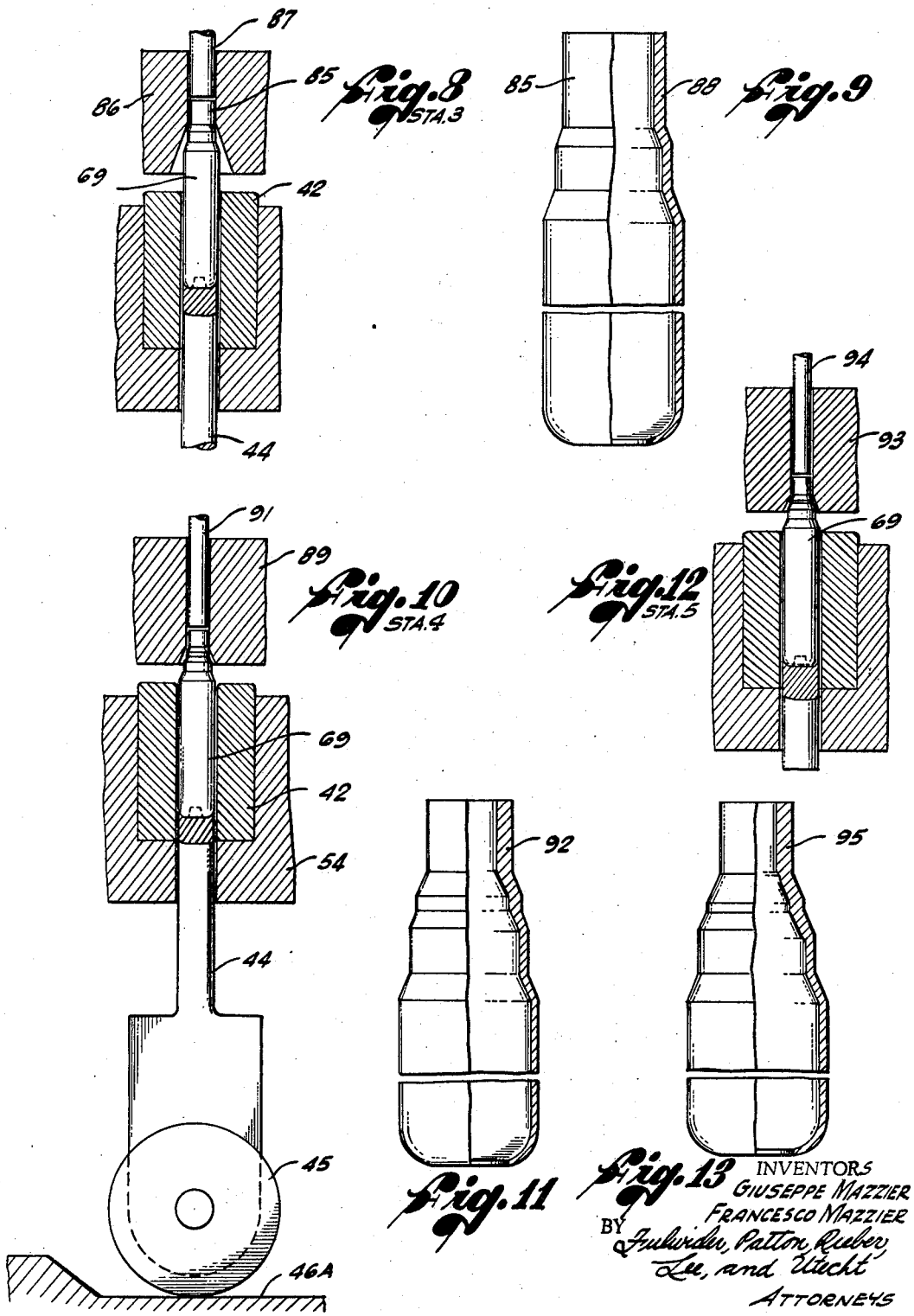

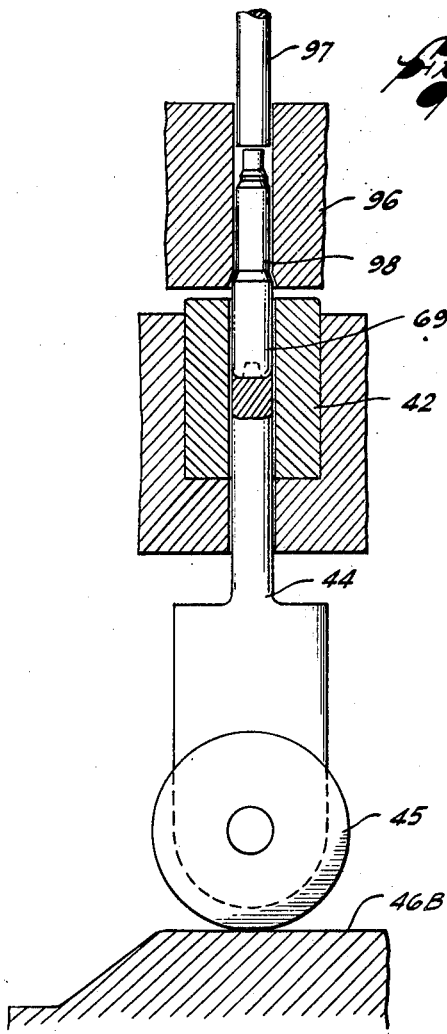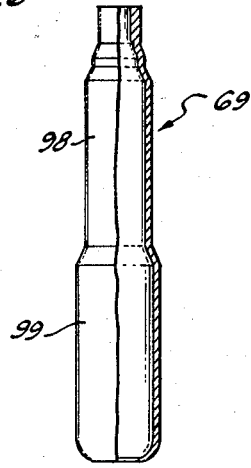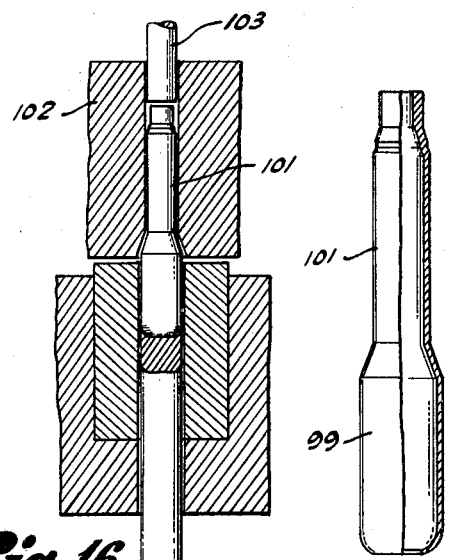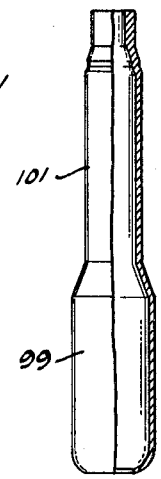

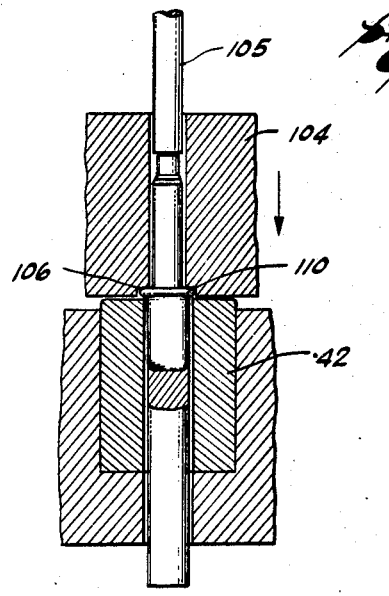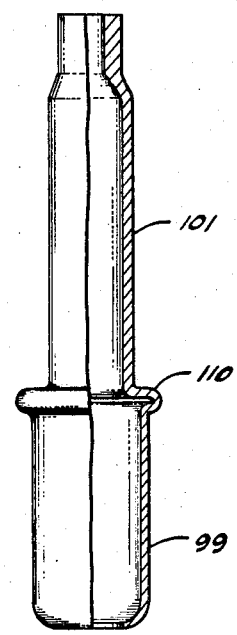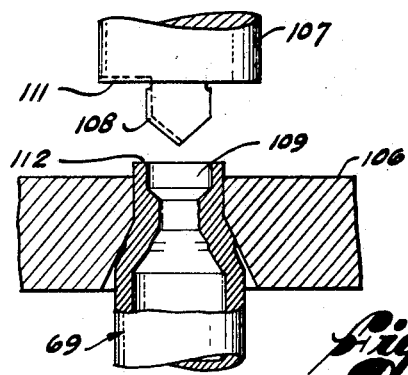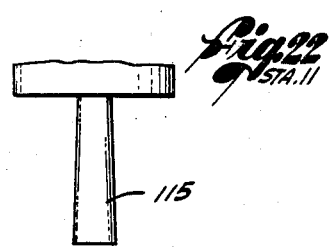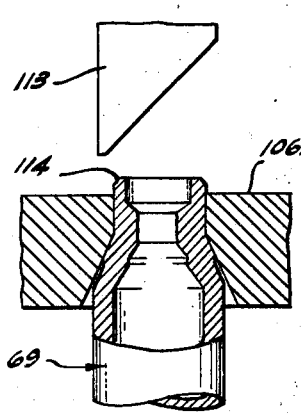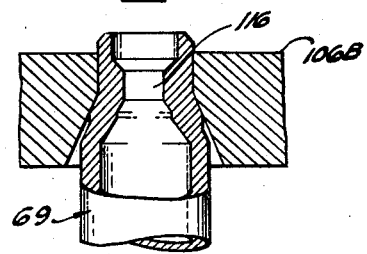

STA. 12

STA. 13

STA. 14

STA. 15

STA. 16

INVENTORS
GIUSEPPE MAZZIER
BY FRANCESCO MAZZIER

Fulwider, Patton, Rieber,
Lee, and Utecht
ATTORNEYS

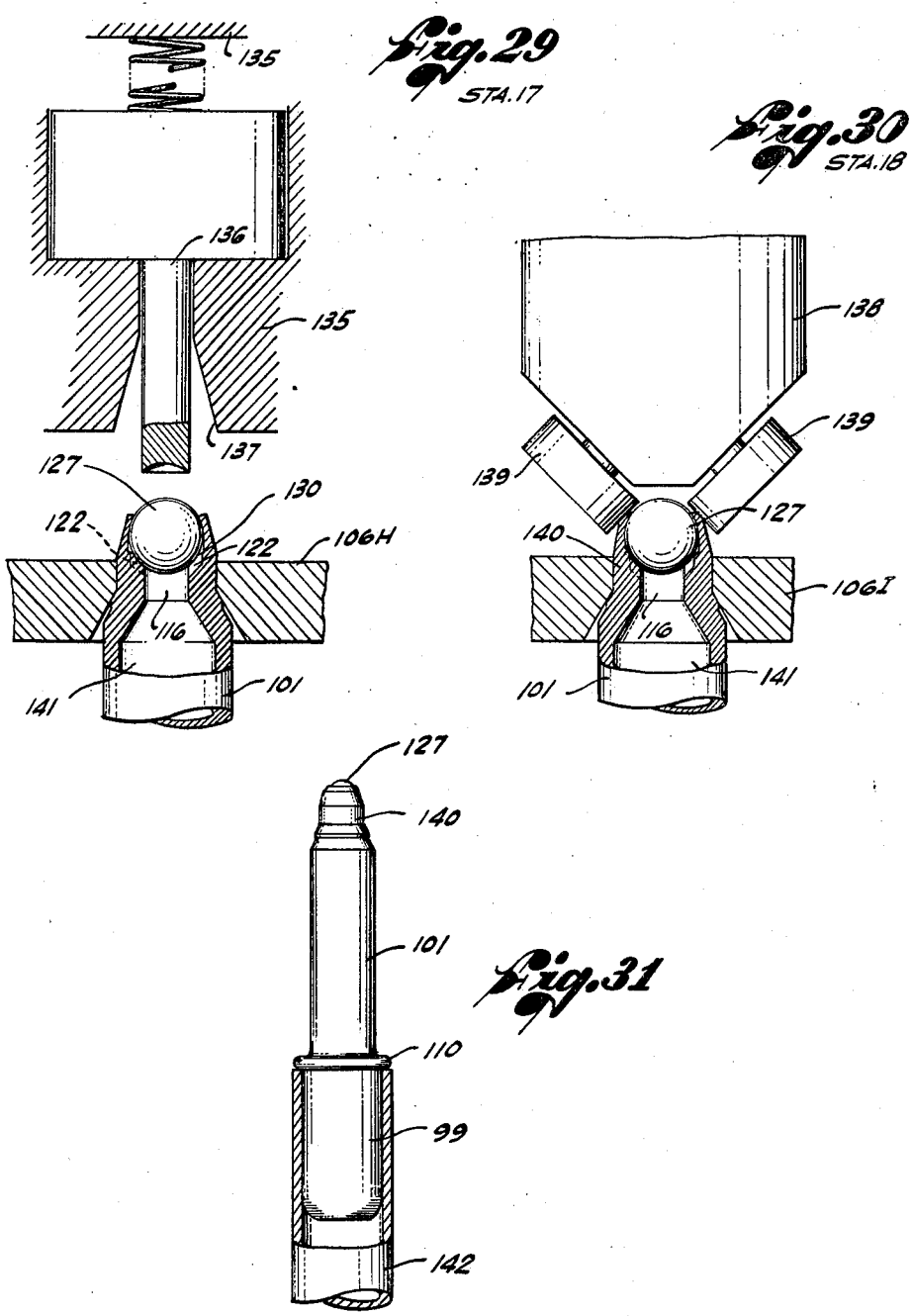

United States Patent Office 3,496,627
Patented Feb. 24, 1970

3,496,627
METHOD OF FORMING BALL TIPS FOR BALL POINT PENS AND BALL TIPS FORMED THEREBY
Giuseppe Mazzier and Francesco Mazzier, Turin, Italy
Continuation-in-part of application Ser. No. 311,769, Sept. 26, 1963. This application May 17, 1967, Ser. No. 639,149
Int. Cl. B23p 11/00
U.S. Cl. 29—441
20 Claims

ABSTRACT OF THE DISCLOSURE

A method of forming ball tips for ball point pens from a continuous coil of tubular stock wherein the stock is straightened and cut to form a tubular section of predetermined length, in which the section is supported for limited universal transverse movement to maintain its concentricity with exterior dies while reducing the exterior diameter of one end of the tubular section and increasing its wall thickness by a plurality of successive extrusion operations which decrease the internal diameter of said end to a final capillary, ink-feeding passage, forming a ball socket and feed grooves inside said section end and inserting a ball in said socket for rotation therein. Internal forming tools are avoided, as are problems of eccentricity and of stripping from small internal plungers. Drilling and machining of wire or bar stock are avoided. The article produced by this forming method has an interior diameter at its end remote from the ball tip which is less the exterior diameter of the ball tip to prevent telescoping of finished ball tips within each other, a forward portion of which is work hardened and of reduced external diameter, and a non-drilled internal capillary aperture leading to a ball socket having a burnished surface.

Cross-reference to related applications

This application is a continuation-in-part of applicant's co-pending application Ser. No. 311,769, filed Sept. 26, 1963, now abandoned for Method for Manufacturing Writing Points for Ball Pens, by Upsetting of Small Tubes, based on application No. 19,520/62 (now Patent No. 675,865), filed in Italy on Oct. 1, 1962; this present application being based on application No. 50,424 A/67, filed in Italy on Feb. 3, 1967.

Background of the invention (1) The present invention is directed to a method of forming ball tips for ball point pens providing an ink-applying ball rotating in a socket connected by a capillary, ink-feeding passage to an ink supply tube, and to ball tips for ball point pens formed thereby.

(2) The prior art known to applicants is represented by the patents cited in the above-identified co-pending applications as follows:
Lindemon et al., Patent No. 1,920,409, Knobel Patent No. 2,646,761, Kahn et al., Patent No. 2,969,030.

These references are representative of the methods and articles known in the prior art whose operation and production have been accompanied with many difficulties arising particularly from the small size of the articles in question and the accuracy which must be achieved in the capillary passage and in the fitting of the socket and rotating ball.

The Lindemon et al., patent is not directed to ball tips for ball points pens, does not relate to a method of producing such ball tips nor to the method of production disclosed and claimed herein which solves problems previously encountered in the formation of ball tips for ball point pens.

The Knobel patent discloses the formation of a ball tip for ball point pens requiring multiple machining operations in which, particularly in the final drilling operations, very fine tools must be used which have very short life and must be frequently replaced with attendant high costs and low rate of production.

The patent to Kahn et al., while avoiding some of the drilling inherent in the method of the Knobel patent, initiates production with a flat disc struck from a sheet of metal and forms this disc in successive operations into an elongated extrusion by utilizing both internal and external dies wherein concentricity becomes extremely critical and stripping, particularly of the smallest internal diameter, a difficult problem. The extensive drilling and machining of Knobel and the internal-external extrusion dies of Kahn et al., and their attendant difficulties and problems are avoided by the method of the present invention which also produces a new and improved ball tip for ball point pens thereby.

Summary of the invention

The method of forming ball tips for ball point pens according to the present invention initiates with a continuous coil of tubular stock of brass or other material of an exterior diameter substantially equal to the interior diameter of the ink-carrying tube into which the back end of the tip is to be inserted. The fore end of the coil is first straightened into a tube from which a tubular section of predetermined length is cut, this operation being desirably but not necessarily accompanied by the chamfering of the adjacent end of the stock which becomes the back end of the next tubular section to be cut therefrom. Each tubular section is held relatively loosely in the transverse direction so that it will automatically center itself with respect to the interior surface of an exterior diameter reducing die applied thereto. The so-held tubular section is desirably successively indexed at a plurality of stations at which, in successive operations, external dies are applied thereto to reduce the exterior diameter of the front end of the tubular section, while increasing the wall thickness thereof, by a plurality of successive extrusion operations. In these operations the internal diameter of the front end of the tubular section is reduced to the dimension of or slightly smaller than the dimension of the desired final capillary, ink-feeding passage.

During the successive extrusion operations, the elongation of the tubular section is restricted to selected dimensions and the bodily projection or location of the tubular section is controlled by a support for the back end thereof which also serves to form the desired internal back end diameter by a projecting central portion on the back end support. This back end internal diameter is desirably less than the exterior diameter of the front end of the ball tip to prevent telescoping of the front end of one ball tip into the back end of another.

By loosely holding the tubular section in a transverse direction it is automatically centered within the external dies applied thereto in the succession of extrusion operations, and by avoiding the use of internal extrusion tools, not only is the difficulty of eccentrically between internal and external tools avoided, but the stripping operation which is particularly critical with the smallest internal diameter is avoided. It is a particular feature of this invention and a major object thereof to avoid this difficulty of eccentricity of internal and external dies used in the prior art.

It is also a major object of this invention to avoid the many machining and drilling operations which have been required when using wire or bar stock for the tips, where frequent repair and replacement of drills and tools have resulted in increased costs and reduce production. In the method of the present invention, only the ball socket need be machined and the side walls and ball-receiving seat of the socket are desirably burnished after the machining operation to facilitate rotation of the ball in the socket in the writing operation.

The ball tip formed by the recited method is an improvement over that known in the prior art in the dimensioning of the back end internal diameter so as to exclude the forward diameter of another tip from telescoping therein, and in the burnished bearing surfaces of the socket to facilitate ball rotation therein.

The present invention has within its general objects the high production, low cost, precision forming of ball tips for ball point pens. More specific objects will be understood from the descriptions and features previously recited herein and others which will be apparent to those skilled in the art from the following specification and appended drawings.

Brief description of the drawings

FIGURE 4 is a view, partly in section and partly in elevation, of the first forming station of FIGURE 1 at which a tubular section work piece is cut from the stock and located in a table holder by which it is carried through the successive operating steps of the tip-forming method of this invention;

FIGURE 5 is a view, partly in section and partly in elevation of the tubular section work piece which was cut from the tubular stock in FIGURE 4;

FIGURE 6 represents the first extrusion operation on the work piece section effected at what may be designated section 2 on the apparatus of FIGURE 1;

FIGURE 7 is a view, partly in section and partly in elevation, of the work piece after the operation of FIGURE 6;

FIGURE 8 represents a second extrusion operation on the forward-end of the work piece at what may be designated station 3 in the apparatus of FIGURE 1;

FIGURE 9 is a view, partly in section and partly in elevation, of the tubular section work piece after the operation of FIGURE 8;

FIGURE 10 is a view showing a third extrusion operation on the forward end of the work piece, at station 4;

FIGURE 11 is a view, partly in section and partly in elevation, of the work piece after the operation of FIGURE 10;

FIGURE 12 represents a fourth extrusion operation on the forward end of the work piece, at station 5;

FIGURE 13 is a view, partly in section and partly in elevation, of the work piece after the operation of FIGURE 12;

FIGURE 14 is a representation of the operation of reducing the diameter of the portion of the work piece shank in back of the tip, at station 6;

FIGURE 15 is a view, partly in section and partly in elevation, of the work piece after the operation of FIGURE 14;

FIGURE 16 is a representation of a second reduction of the diameter of the portion of the work piece in back of the tip, at station 7;

FIGURE 17 is a view, partly in section and partly in elevation, of the work piece after the operation of FIGURE 16;

FIGURE 18 is a representation of the operation of forming the insertion limiting flange on the work piece, at station 8;

FIGURE 19 is a view, partly in section and partly in elevation, of the work piece with the flange thereon formed by the operation of FIGURE 18;

FIGURE 20 is a view representing the formation step of boring the ball socket and facing the forward edge of the work piece, at station 9, the work piece being shown at the conclusion of the operation;

FIGURE 21 represents the step of outside chamfering of the forward edge of the work piece, at station 10, and shows the work piece at the conclusion of the operation;

FIGURE 22 is a representation of the step of punching the capillary passage within the tip to the proper size, at station 11, and shows the work piece at the conclusion of the operation;

FIGURE 29 illustrates the final seating of the writing ball and the swaging of the edge of the tip thereabout, at station 17;

FIGURE 30 illustrates the step of spinning or rolling the edge of the tip to loosen the ball for rotation in the socket, at station 18; and FIGURE 31 is an elevational view of the finished ball tip including a representation of how it may be inserted in an ink-bearing tube.

Description of the preferred embodiment

Figure 1:
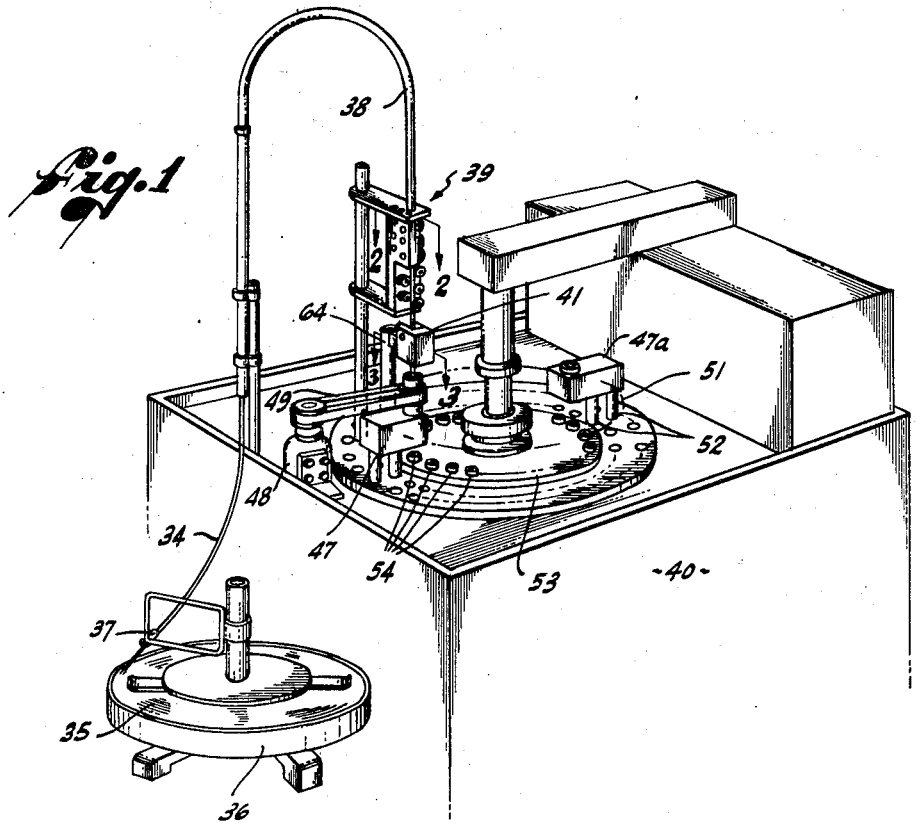
FIGURE 1 is a partial, perspective view of an apparatus employing multiple operating stations and a stepping turntable indexing therewith which may be used in carrying out the method according to the present invention.
Figure 2:
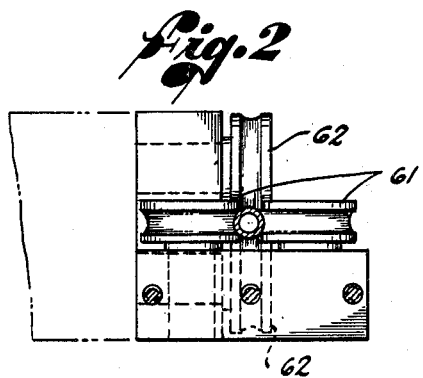
FIGURE 2 is a detail, sectional view on the line 2—2 of FIGURE 1 showing the stock-straightening rollers.
Figure 3:
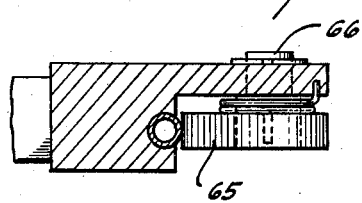
FIGURE 3 is a detail, sectional view on the line 3—3 of FIGURE 1 showing the stock-advancing means.

The apparatus illustrated in FIGURES 1 through 4 is representative of a convenient structure which may be utilized in carrying out the steps of the method of the present invention. The tubular section work pieces from which the ball tips are made are carried in the same seats in a turntable which successively indexes the seats with a plurality of stations at each of which a forming operation may be carried out. In addition to the forming stations which have been described and specifically illustrated in the drawings, it will be understood that the apparatus may include additional stations for sizing, cleaning, inspection and other incidental steps in the complete operation which do not involve forming steps on the tubular section work piece.

The tubular stock 34 from which the tubular section work pieces are cut is preferably supplied in the form of a coil 35 mounted in a conventional holder 36 and fed through a rotating guide tube 37 to a stationary, inverted U-shaped supporting and guiding tube 38. While the tubular stock could be fed as straight lengths, it is of such small diameter and thin wall thickness that it has little inherent strength and is not self-supporting for any considerable length, so that it is more conveniently fed from the continuous coil 35. The tubular stock 34 may be of brass or other metallic material with, by way of example only, an exterior diameter of approximately 2.18 millimeters and a wall thickness of approximately 0.3 millimeter.

The stock 34 emerging from the downward feeding end of the U-shaped tube 38 is fed through sets of straightening rolls 39 by means of a reciprocating feeder 41. The straightened tubular stock 34 is fed into a tubular socket holder 42 wherein it remains throughout the successive steps of forming the ball tip to be hereinafter described. What is to be the back end of the ball tip is received in a forming seat 43 at the forward end of the plunger 44 whose position relative to the seating socket 42 is determined by a roller or wheel 45 on which the plunger 44 is mounted, the roller or wheel 45 rolling on a camway 46 as the turntable of the machine rotates.

Referring back to FIGURE 1, one of the operating heads is illustrated at 47. This head contains the cut-off and chamfering tools shown in FIGURE 4 which are rotated by a motor 48 through a drive which includes a belt 49. Other operating work-performing heads are circularly placed around the machine 40, as represented by the interrupted line circle 51 and the head 47A. The heads 47–47A are manipulated in vertical directions by means of tubes and rods 52 connected to mechanism under the top of the machine 40. An exemplary turntable is shown at 53 having a plurality of circularly disposed and spaced indexing and holding elements 54 mounted therein having recesses 55 in their top portions which receive the tubular holders 42, as shown more particularly in FIGURE 4. The elements 54 have bores 56 therethrough concentric with the internal diameters of the seats 42 for the passage of the plungers 44 therethrough. The exterior surfaces of the elements 54 are of frusto-conical shape at 57 to be engaged by complementary frustoconical surfaces on an indexing and locking plate 58 carried by the head 47.

The straightener 39 which has been shown by way of example in the drawings as usable in the method of the present invention employs opposed rollers 61 in one plane and 62 in a plane at right angles thereto, which rollers are free-rolling and straighten the tubular stock 14 as it passes therebetween upon being fed by the feeder head 41. The feeder head 41 has an adjustable stroke by the adjustable arm 63 and reciprocating rod 64. It carries a spring-biased clamping element 65 rotating about shaft 66, the clamping element 65 permitting the feeder head 41 to move freely in the upward direction relative to the tubular stock 34, but frictionally clamping the stock 34 in the head 41 in the downward direction to feed the stock through the head 47 into the tubular holder 42 at the first machine station, FIGURE 4.

At the end of the stock feeding stroke, the motor 48 rotates a cutting tool diagrammatically illustrated in FIGURE 4 at 67 to cut off the desired length of stock 34 into a tubular section work piece 69. At the same time, or at the same station, it is desirable but not required that a chamfering tool, indicated diagrammatically at 68, chamfer at 71 the free end of the tubular stock 34 which will become the back end of the succeeding work piece. The motions of the cut-off tool 67 are diagrammatically illustrated by the arrows 72 and the motions of the chamfering tool 68, in addition to its rotation, are indicated by the arrows 73.

The work piece 69 is shown in FIGURE 5 and has a length, by way of example only, of approximately 11.7 millimeters. It will be understood that the first piece cut from a new coil 35 should be removed and discarded since it will have no chamfer 71 on its end.

The forming seat 43 at the top of the plunger 44 is of a flat cup shape and has a central, upwardly-projecting post 74 thereon which is received within the back end of the tubular section work piece 69. The cam face 46 supporting the plunger 44 remains horizontal unless shown otherwise in the drawings and so described. Thus, at the second forming station of FIGURE 6, the plunger 44 is in the same neutral position as in FIGURE 4.

FIGURE 6 illustrates the first reduction of the outside diameter of the ball end of the work piece section indicated at 75 as being effected by an external only extrusion die 76 pressed downwardly upon the upper, free end of the work piece 69 by a reciprocating head 47–47A which also contains a length-limiting plunger 77 which remains stationary while the die 76 reciprocates vertically.

It will be particularly noted in FIGURE 6 that the tubular holder 42 has an interior diameter 78 which is slightly greater than the exterior diameter of the work piece tubular section 69 so that the work piece is free to move a limited amount transversely in all directions to automatically align itself concentrically within the forming opening 81 in the die 76, being guided thereinto by the conical bottom opening 79. Therefore, the work piece 69 will be automatically centered with respect to the opening 81 in the die 86 and the desired concentricity between the die opening and the work piece will be attained automatically as the work piece freely moves universally in transverse directions, tilting on the seat 43. The stationary plunger 77 in FIGURE 6 determines the length of the work piece of FIGURE 7 and effects a thickening of the wall 82 of the work piece 69 at the reduced diameter end 75. At the same time the diameter 75 is being reduced, the work piece 69 will be forced downwardly against the seat 43, thereby forming the back end 83 of the work piece into a rounded configuration, as shown in FIGURE 7, with an internal diameter 84 determined by the diameter of the base of the post 74 projecting from the seat 43.

It will be seen that in the extrusion operation of FIGURE 6, only an external die 76 is used and that no complementary internal die enters the work piece 69 to introduce problems of possible eccentricity and stripping difficulty. The plunger 77 is stationary to regulate the length of the formed work piece of FIGURE 7 to insure thickening of the wall portion 82. The stationary plunger 77 holds the work piece 69 on its seat as the die 76 is moved upwardly therefrom after the extruding operation.

After the extrusion operation of FIGURE 6, the turntable 53 is stepped to the next work-forming station and the tubular seat 42 and work piece 69 indexed therein, as above described. This third work-forming station and the operation therein is illustrated in FIGURE 8 as a second reduction of the exterior diameter of the free end of the work piece 69 at 85 by a vertically reciprocating die 86, the length of the work piece being determined by the position of a relatively stationary rod 87. Concentricity of the work piece with the opening in the die 86 is again automatically secured by the universal transverse movement of the work piece 69 provided by the larger diameter 78 of its tubular holder 42. The product resulting from the second extrusion operation of FIGURE 8 is shown in FIGURE 9 with a thickened wall portion at 88.

At a fourth work-forming station illustrated in FIGURE 10, the plunger 44 drops the work piece 69 downwardly by moving to a lower cam surface 46A to provide better support for the free end of the work piece 69 and in this station a third reduction of the ball end of the work piece is effected by a die 89 which reciprocates vertically, the length of the work piece being maintained by a relatively stationary rod 91 so that the reduction of external diameter is accomplished by a thickening of the wall of the work piece end at 92, as shown in FIGURE 11.

At a fifth work-forming station, FIGURE 12, a fourth reduction of the exterior diameter of the ball end of the work piece section is effected by a vertically reciprocating die 93, the length of the work piece being held by a relatively stationary rod 94, so that there is a further thickening of the ball end of the work piece at 95 in FIGURE 13.

At a sixth work-forming station, shown in FIGURE 14, the roller 45 moves onto a higher cam surface 46B to elevate the plunger 44 and move a large portion of the body of the work piece 69 out of the tubular holder 42 and at this time an external die 96 reciprocates vertically relative to a stationarily held rod 97 to make a first reduction of the diameter of the forward portion of the work piece at 98 in back of the ball end diameter reductions previously made. The rod 97 regulates the length of the formed work piece of FIGURE 15 which now has a forward body portion 98 of reduced diameter and a back body portion 99 of the original tubular stock diameter.

At a seventh work-forming station, illustrated in FIGURE 16, a second reduction is made in the external diameter of the forward body portion at 101 by an external die 102 which reciprocates vertically, while a length-determining rod 103 is held stationary. The back portion of the work piece remains the same at 99, while the forward portion 98 is changed to that shown at 101 in FIGURE 17.

At the next work-forming station, the procedure illustrated in FIGURE 18 is effected by means of a reciprocating die 104 which moves vertically relative to a length-holding stationary rod 105 to form on the work piece 69 an integral limiting flange 110 in a recess 106 in the die 104 above the top surface of the tubular holder 42. An inspection of FIGURE 16 relative to FIGURE 18 shows that the flange 105 is formed by the body material between the top of the tubular holder 42 and the reduced diameter portion 101.

The work piece resulting from the operation at station 8, FIGURE 18, is shown in FIGURE 19, where the limiting flange 110 is disposed between the body portion 99 having the original diameter of the tubular stock and the reduced diameter body portion 101.

At work-forming station 9, illustrated in FIGURE 20, a spring-loaded hold-down bushing 106 engages and steadies the free end of the work piece 69 while a tool 107 bores and faces the ball end of the work piece. The opening in bushing 106 is concentric with the axis of the tool spindle and moves up with the spindle when the turntable is indexing between stations. The tool 107 has a vertical and inclined edge at 108 which performs the first boring of the ball socket 109 and a face-cutting edge at 111 which faces the forward end 112 of the work piece.

At the next work-forming station 10, illustrated in FIGURE 21, a hold-down bushing 106A, similar to that at 106 of FIGURE 20, holds the free end of the work piece while a rotating tool 113 chamfers the outer edge of the forward end of the work piece at 114.

At work-forming station 11, illustrated in FIGURE 22, a hold-down bushing 160B supports the free end of the work piece 69 while a non-rotating punching tool 115 sizes the capillary passage 116 leading from the body portion 101 of the tip into the ball socket.

Figure 23:
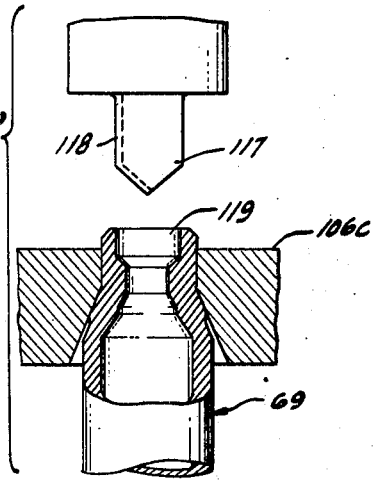
FIGURE 23 represents the step of finish boring the ball socket, at station 12, and shows the work piece at the conclusion of the operation.

At work-forming station 12, illustrated in FIGURE 23, the free end of the work piece 69 is again held by a spring-loaded hold-down bushing 106C while finish boring of the ball socket is performed by a boring tool 117 having a vertical and angular cutting edge 118 to form the ball socket 119.

Figure 24:
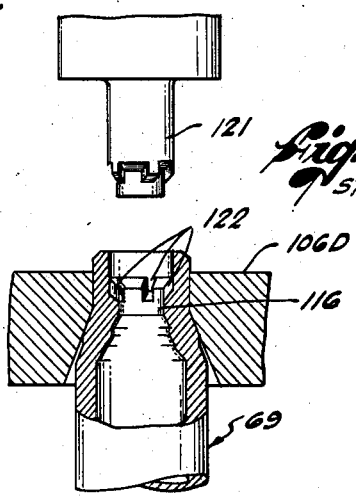
FIGURE 24 illustrates the step at station 13 of forming the ink grooves between the capillary passage and the ball socket, the work piece being shown at the conclusion of the operation.

At a thirteenth work-forming station, illustrated in FIGURE 24, the free end of the work piece 69 is held by a bushing 106D while a non-rotating spline broach 121 forms ink grooves 122 leading from the capillary passage 116 to the ball socket.

Figure 25:
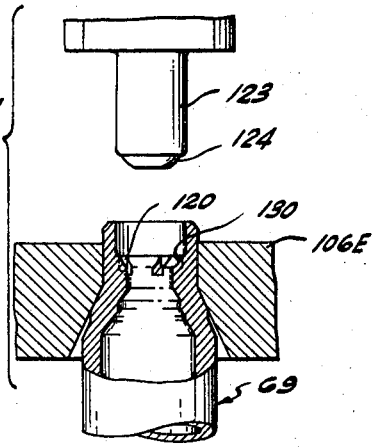
FIGURE 25 illustrates the step of final sizing and contouring the ball socket seat and the burnishing of the surfaces thereof, at station 14.

At a fourteenth work-forming station, illustrated in FIGURE 25, the free end of the work piece 69 is held by a spring loaded hold-down bushing 106E, while a ball seat 120 is contoured with a circular ink ring 130 immediate adjacent thereto by a tool 123 which is non-rotating and has a contouring end 124 for the ball seat. The tool 123, in addition to contouring the ball seat to the exact size and configuration desired for free rotation of the writing ball, also serves to burnish the surfaces of both the ball seat and the side walls of the ball socket to facilitate rotation of the ball in the socket on its seat.

Figure 26:
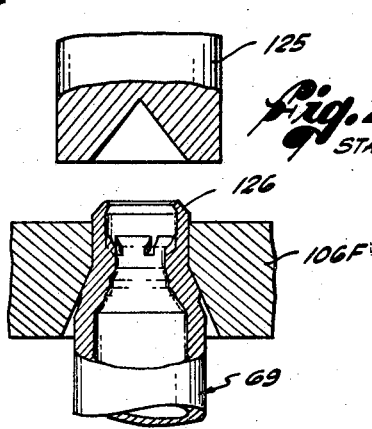
FIGURE 26 illustrates the step of preliminary closing of the upper edge of the tip, at station 15.

In a fifteenth work-forming station, illustrated in FIGURE 26, the free end of the work piece 69 is held by a bushing 106F, while a non-rotating coining tool 125 effects a preliminary closing of the ball socket rim at 126, the rim being sufficiently resilient to pass the writing ball therethrough into its socket, but thereafter holding the ball against involuntary removal.

Figure 27:
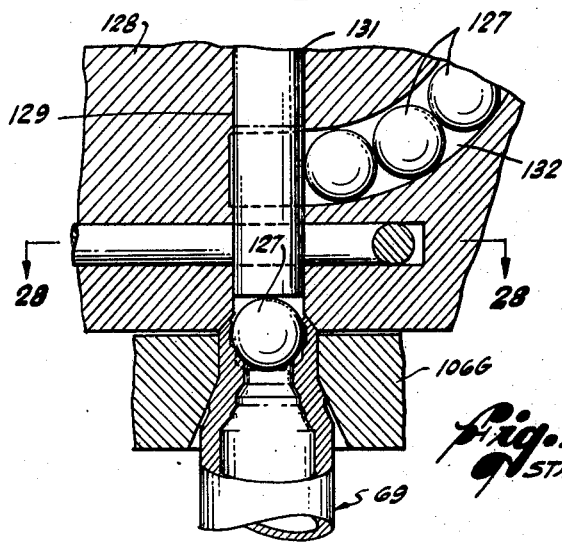
FIGURE 27 illustrates the step of inserting a ball into the ball socket of the tip, at station 16.

In a sixteenth work-forming station, illustrated in FIGURE 27, a writing ball 127 is inserted into socket 119 by forcing it past the slightly preclosed rim 126. The balls 127 may be of hardened steel or other materials receiving ink on their surfaces and depositing it on a writing surface as the ball rolls thereon. The balls 127 may be inserted in their sockets by any desired mechanism, a convenient form being shown in FIGURES 27 and 28 as including a body portion 128 having a bore 129 therethrough in which reciprocates a plunger 131. The balls 127 are fed through a channel 132 to a position aligned with the bore 129, but held between the legs 133 of a hairpin-like spring 134. After the work piece is indexed at station 16, the plunger 131 is moved downwardly to press a ball 127 past the spring legs 133 and the socket rim 126. The free end of the work piece 69 is again held by a spring-loaded holddown bushing 106G.

Figure 28:
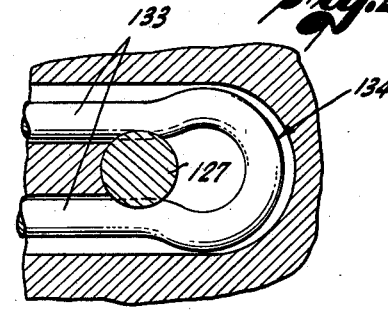
FIGURE 28 is a detail sectional view on the line 28—28 of FIGURE 27 to illustrate the manner in which the writing balls are held and fed at station 16, illustrated in FIGURE 27.

At a seventeenth work-forming station, illustrated in FIGURE 28, the work piece end is held by bushing 106H while the ball 127 is seated and the end of the ball tip is tightly closed by a non-rotating coining tool 135 which moves relative to a spring-loaded hold-down rod 136. The rod 136 holds the ball 127 against its seat 120 while the surface 137 of the coining tool 135 swages the end of the work piece tightly around the ball to close its socket.

After the operation of FIGURE 29, the ball is tightly held by the side walls of its socket and it is released for rotation by a spinning operation illustrated in FIGURE 30 at an eighteenth work-forming station. The free end of the ball tip is held by a hold-down bushing 106I, while a spinning tool 138 rotates ball bearing wheels or rollers 139 around the rim of the ball socket, this operation serving to slightly loosen the socket walls from the ball and permit its free rotation within the socket upon its seat therein.

The operation of FIGURE 30 completes the ball tip as illustrated in FIGURE 31, having the original stock diameter back body portion 99, the reduced diameter forward body portion 101, the thick wall, small diameter forward portion 140, and the rotating writing ball 127 which is fed with ink from the interior 141 of the tip through the capillary passage 116 and the ink-supplying grooves 122 and ring 130 into contact with the ball surface.

The ball tip is shown in FIGURE 31 as it may be inserted into an ink supply tube 142, with the flange 110 bearing against the end of the tube 142.

The internal diameter 84 at the back end of the ball tip is made less than the diameter of the forward end 140 of the ball tip so that when the tips are disposed in bins or feeders, or in other groupings, there will be no telescoping of the forward end of one tip into the rear end of another tip.

The method according to the present invention forms ball tips for ball point pens from tube sections cut from a continuous coil or thin wall tubular stock. The wall thickness adjacent the writing end of the tip is increased by reduction of the external diameter of the tubular stock to provide thereat a passage adjacent the ball socket which is of capillary dimension. All extrusion operations are effected with external dies only, whereby there are no problems of stripping arise with reference to small diameter plunger and mandrel dies. Drilling, boring and machining opeartions are kept to a minimum and are employed only in forming the ball socket.

The capillary passage is formed to size by a simple punching operation, thus avoiding the use of small drills with attendant increase in costs and loss of production incident to dulling, breaking or other damage to the small drills which are conveniently used to form the capillary passage in a drilling operation.

The final forming of the ball socket and its seat is accomplished by means of a tool which burnishes the surfaces thereof, whereby the ball more readily rotates within its socket on the seat provided therefor.

The tubular section work piece is at all times throughout the entire cycle of work-forming operations supported in the same tubular holder which is successively indexed with a plurality of work-forming stations. The holder for the work pieces has an internal diameter slightly greater than the external diameter of the work piece to provide for universal transverse movement of the work piece so that it automatically attains concentricity with the external dies which are moved thereon to perform the diameter-reducing, extrusion operations. The relatively stationary rods which maintain the length of the work piece during the extrusion operations also serve to hold the work piece while the extrusion die is being withdrawn, and the stationary rod in the first extrusion operation serves to force the work piece downwardly to form the back end of the ball tip against its supporting seat.

The ball tips resulting from the method above-described are formed and dimensioned to prevent undesired telescoping when randomly stored or mounted end-to-end in feeders and have a forward wall portion which is work hardened and thickened from thin wall stock so that a non-drilled internal capillary aperture can be provided leading to the ball socket. The ball seat and the socket walls are provided with burnished surfaces to facilitate rotation of the writing ball therein.

While certain preferred embodiments of the present invention have been specifically described and illustrated herein in accordance with the patent statutes and rules of practice, it will be understood that the invention is not limited thereto, as many variations will be apparent to those skilled in the art, and the invention is to be given its broadest interpretation within the terms of the following claims.

We claim:

1. A method of forming ball tips for ball point pens which comprises:
    cutting from relatively thin wall tubular stock a work piece tube of predetermined length;
    supporting said work piece tube for limited universal transverse movement;
    successively reducing the exterior diameter of an end of said work piece by a plurality of external only extrusion operations while simultaneously restricting the length of the tubing to increase the wall thickness at the reduced diameter portions thereof,
    said end of said work piece automatically assuming a concentric position with respect to the bores of the external extrusion dies by the universal transverse movement permitted by its support,
    the final extrusion operation thickening the wall of the work piece adjacent said end to an extent to leave no larger than a capillary size ink-feeding internal passage adjacent said end;
    forming a ball socket in the said end of said work piece communicating with said ink-feeding passage; and
    forming the socket walls around said ball to retain the ball in the socket while permitting rotation of the ball therein during a writing operation.

2. A method of forming ball tips for ball point pens as defined in claim 1, including the step of:
    supporting said work piece at its back end for tilting movement while holding it loosely sidewise to provide for limited universal transverse movement of the forward end of the work piece.

3. A method of forming ball tips for ball point pens as defined in claim 1, including:
    providing an exterior chamfer on the back end of said work piece; and
    rounding the chamfered back end of said work piece inwardly to an internal diameter less than the exterior diameter of the ball-carrying end of the finished ball tip.

4. A method of forming ball tips for ball point pens as defined in claim 1, in which said extrusion operations are effected by a plurality of separate external only extrusion dies having bores therein of successively increasing diameter and without complementary internal forming elements.

5. A method of forming ball tips for ball point pens as defined in claim 2 including the steps of:
    retracting the work piece within its holder before the final reduction of the external diameter of the forward end thereof to provide closer sidewise support for the work piece forward end.

6. A method of forming ball tips for ball point pens as defined in claim 2 including the steps of:
    advancing said work piece to expose a greater length thereof beyond the means providing sidewise support thereto; and
    forming an integral exterior flange on said work piece substantially at its point of exposure from sidewise support,
    the portion of said work piece in back of said flange being of substantially the initial diameter of the tubular stock and the work piece in front of said flange being of a reduced diameter,
    said flange serving to limit the insertion of the rear end of the ball tip into an ink-carrying tube.

7. A method of forming ball tips for ball point pens as defined in claim 1 in which:
    forming said ball socket by boring into said reduced diameter end of the work piece;
    forming ink-feeding grooves between the ball socket and the ink-feeding passage;
    contouring a ball seat at the back end of said socket; and
    burnishing the surfaces of said socket and of said seat to facilitate rotation of the ball therein.

8. A method of forming ball tips for ball point pens as defined in claim 1 including the step of:
    punching said ink-feeding internal passage to predetermine capillary size prior to the insertion of the ball in the socket.

9. A method of forming ball tips for ball point pens as defined in claim 1 including:
    feeding said tubular stock from a continuous coil thereof; and
    cutting said work piece from the free end thereof.

10. A method of forming ball tips for ball point pens as defined in claim 9 including the step of:
    straightening the free end of said tubular stock coil before cutting the predetermined length of work piece therefrom.

11. A method of forming ball tips for ball point pen as defined in claim 1 including the step of:
    chamfering the free end of said tubular stock as the back end of the work piece before cutting the forward end of the work piece from the stock.

12. A method of forming ball tips for ball point pens as defined in claim 11 in which:
    said chamfering operation being performed substantially at the same time that the forward end of the preceding work piece is severed from the end of the tubular stock.

13. A method of forming ball tips for ball point pens as defined in claim 1 including the steps of:
    preclosing the rim of the socket to a ball-retaining dimension;
    inserting a writing ball in said socket by pressing it past the rim of the socket;
    coining the socket walls tightly around the ball; and
    spinning the exterior end of the socket to free ball.

14. A method of forming ball tips for ball point pens as defined in claim 1, including:
    supporting said work piece in the same retaining holder throughout all of the steps in the method of forming the ball tips; and successively and sequentially indexing said holder with successive work stations at which the successive steps in the method of formation are performed.

15. A method of forming ball tips for ball point pens as defined in claim 3, in which:
said internal rounding of the back end of the work piece being performed by the forcing of the work piece against its supporting seat during the application of the initial extrusion die to the forward end of the work piece.

16. A method of forming ball tips for ball point pens as defined in claim 3, in which the back end of the ball tips is moved inwardly to an internal diameter less than the exterior diameter of the forward end of the ball tip to prevent telescoping of one ball tip into another.

17. A ball tip for ball point pens formed by the method defined in claim 1 having an enlarged-diameter, integral, expanded flange intermediate the ends of the tip, the portion of said tip in back of said flange being of substantially the same diameter as the original tubular stock and the external diameter of the portion of the tip in front of said flange being of a moderately reduced diameter for most of its length and of a drastically reduced diameter adjacent the writing ball to provide a heavy wall thickness and a capillary size ink-feeding passage in the tip communicating with the writing ball at the end of the tip.

18. A method of forming ball tips for ball point pens which comprises:
cutting from relatively thin wall tubular stock a work piece tube of predetermined length;
exteriorly supporting said work piece tube;
successively reducing the exterior diameter of an end of said work piece by a plurality of external only extrusion operations to work harden and increase the wall thickness of the reduced portions thereon;
the final extrusion operation thickening the wall of the work piece adjacent said end only to an extent to leave an ink-feeding internal passage adjacent said end;
forming a ball socket in the said end of said work piece communicating with said ink-feeding passage; and
forming the socket walls around said ball to retain the ball in the socket while permitting rotation of the ball therein during a writing operation.

19. A method of forming ball tips for ball point pens which comprises:
cutting from relatively thin walled tubular stock a work piece tube of predetermined length having an axial opening therethrough;
supporting said work piece tube from the exterior;
successively reducing the exterior diameter of an end of said work piece by a plurality of solely externally applied extrusion operations to work harden and increase the wall thickness at the reduced diameter portions thereon while leaving the axial opening therethrough;
the final externally applied extrusion operation thickening the wall of the work piece adjacent said work hardened end only to an extent so as to reduce the terminal end of said axial opening to an ink-feeding internal passage within said end;
machining a ball receiving housing in the said work hardened end of said work piece so that the thickness of said machined wall portion is substantially less than the wall thickness of the unmachined portion of said work hardened end, said housing communicating with said ink-feeding passage; and
forming the machined walled portion around said ball to retain the ball in said housing while permitting rotation of the ball therein during writing.

20. A method of forming ball tips for ball point pens as claimed in claim 19 and further characterized by upsetting said tube to form thereon a small external flange at a point intermediate the length of the tube.

References Cited

UNITED STATES PATENTS

| | | | |
|---|---|---|---|
| 1,920,409 | 8/1933 | Lindemon et al. | 72—340 |
| 2,646,761 | 7/1953 | Knobel | 29—441 |
| 2,969,030 | 1/1961 | Kahn et al. | 113—32 |
| 3,230,935 | 1/1966 | Fehling et al. | 120—42.4 |
| 3,389,456 | 6/1968 | Ishizuka | 29—558 X |

THOMAS H. EAGER, Primary Examiner

U.S. Cl. X.R.

29—558; 72—340; 113—32; 120—42.4